United States Patent [19]
Jeanneret

[11] Patent Number: 5,408,169
[45] Date of Patent: Apr. 18, 1995

[54] DEVICE FOR CONTROLLING AN ASYNCHRONOUS MOTOR

[75] Inventor: Rene Jeanneret, Merzlingen, Switzerland

[73] Assignee: SMH Management Services AG, Biel, Switzerland

[21] Appl. No.: 79,603

[22] Filed: Jun. 22, 1993

[30] Foreign Application Priority Data

Jun. 23, 1992 [FR] France ............... 92 07771

[51] Int. Cl.⁶ .................................................. H02P 5/40
[52] U.S. Cl. .................................... 318/808; 318/805
[58] Field of Search ............... 318/811, 810, 802, 803, 318/800, 807, 808, 805, 811; 363/43, 98

[56] References Cited

U.S. PATENT DOCUMENTS

| | | | |
|---|---|---|---|
| 4,047,083 | 9/1977 | Plunkett | 318/807 |
| 4,320,331 | 3/1982 | Plunkett | 318/805 |
| 4,465,961 | 8/1984 | Landino | 318/811 |
| 4,757,248 | 7/1988 | Fujioka et al. | 318/807 |
| 4,814,683 | 3/1989 | Okamoto et al. | 318/800 |

FOREIGN PATENT DOCUMENTS 0031117 7/1981 European Pat. Off. .
0214301 3/1987 European Pat. Off. .
0254310 1/1988 European Pat. Off. .

OTHER PUBLICATIONS

IEEE Proceedings B. Electrical Power Applications; vol. 127, No. 2, Mar. 1980, Stevenage GB pp. 91–95.

Primary Examiner—William M. Shoop, Jr.
Assistant Examiner—John W. Cabeca
Attorney, Agent, or Firm—Griffin, Butler, Whisenhunt & Kurtossy

[57] ABSTRACT

A control device for an asynchronous motor (2), notably intended for the drive system of an electric vehicle, comprises electric supply source (10) able to produce an AC supply voltage whose frequency (FAL) and amplitude (UAL) may be adjusted independently of one another. For a given frequency of the supply voltage, the amplitude of the voltage is able to vary between a minimum value and a maximum value, the difference between the frequency of rotation of the turning magnetic field in the vicinity of the rotor and the frequency of rotation of the rotor being maintained substantially constant as long as the amplitude of the supply voltage is less than the maximum value. Once the maximum value has been reached, the torque on the shaft of motor (2) is increased by increasing the slip.

10 Claims, 6 Drawing Sheets

DEVICE FOR CONTROLLING AN ASYNCHRONOUS MOTOR

FIELD OF THE INVENTION

The present invention concerns a device for controlling an asynchronous motor, particularly for the drive system of an electric vehicle.

BACKGROUND OF THE INVENTION

A type of asynchronous motor known to the person skilled in the art comprises a stator having a first winding and a rotor having a second electrically-self-contained winding.

When the first winding is connected to a polyphase source of electric energy producing an AC supply current, this first winding generates a turning magnetic field in the vicinity of the rotor. When the rotor rotates at a frequency other than the frequency at which the turning magnetic field rotates, the flux of the turning magnetic field which passes through the rotor's second winding induces in this second winding an induced voltage generating therein an induced electric current. In this latter case, an electromagnetic force acts on the rotor as a result of the coupling between the turning magnetic field and the electric current induced in the second winding, which generates a torque on the motor's output shaft.

The slip S of an asynchronous motor can be defined by the following formula:

$$S = (FST - FRT)/FST$$

where:
FST = Frequency of rotation of the turning magnetic field generated by the supply current,
FRT = Frequency of rotation of the rotor For a given stator frequency FST and a given amplitude of the supply voltage, the supply current can be seen to increase when the slip S increases, and the torque increases when the slip varies between a zero value and a threshold value for which the maximum torque is reached. The range of values of the slip comprised between the zero value and the threshold value defines a range of operation of the motor for a given stator frequency FST and a given supply voltage.

Moreover, for a given stator frequency FST and a given slip S, an increase of the torque can be observed when the amplitude of the supply voltage increases as long as the motor has not reached magnetic saturation.

It will be noted that the saturation value of the magnetic flux through the rotor's winding defines, for a value of the stator frequency FST, a saturation value for the supply voltage amplitude, this saturation value being determined by the type of motor and its dimensions.

As the magnetic flux is substantially proportional to the supply voltage amplitude and inversely proportional to the supply voltage frequency (a whole number multiple of the stator frequency), the nominal operating curve of such an asynchronous motor is generally characterized, on a graph showing the supply voltage amplitude as a function of the supply voltage frequency, by a closely related curve corresponding to a substantially constant torque for a constant slip, over a first range of frequencies whose maximum value corresponds to the nominal maximum supply voltage amplitude. This closely related curve extends through a second range of frequencies following said first range of frequencies by a substantially constant curve situated at the level of the maximum nominal supply voltage amplitude.

For each supply voltage frequency and stator frequency FST respectively, the nominal supply curve sets a fixed and predetermined supply voltage amplitude. Hence, for a given stator frequency, the variation of the torque on the motor shaft is obtained by a variation of the slip S when the motor's operating point is situated on the nominal supply curve.

Generally, control of an asynchronous motor by means of an electronic device is arranged so that the operating point remains on the predetermined nominal supply curve. Such control of an asynchronous motor has several drawbacks. Firstly, in view of the fact that for a given supply frequency the motor always operates with a nominal voltage amplitude, the losses generated are relatively great whatever torque may be required, in particular as regarding the core losses. Secondly, variation of the slip S in order to vary the torque leads to non-optimal working conditions of the motor because the efficiency of an asynchronous motor depends on the value of the slip and hence on the difference between the stator frequency FST and rotor frequency FRT.

Hence, in most instances, the nominal amplitude of the voltage is too high for the required torque and the resulting slip is relatively low, which leads to a non-optimum working conditions of the motor. In other instances, when the required torque is relatively great, the nominal supply voltage amplitude, which is quite remote from the saturation amplitude, leads to a relatively great increase of the slip, which once again leads to non-optimal working conditions of the motor, the losses being in this case relatively great due to the large supply current required.

SUMMARY OF THE INVENTION

The aim of the present invention is to reduce the drawbacks of the above-described control device.

The invention thus provides a device for controlling an asynchronous motor having:
 a stator winding arranged to produce a turning magnetic field at a stator frequency in response to an AC supply voltage applied to said stator winding and producing a supply current;
 a rotor comprising a rotor winding magnetically coupled to said stator winding, this rotor rotating at a rotor frequency in response to said turning magnetic field; the control device comprising electric supply means for producing said supply voltage and being characterized in that said electric supply means are arranged to produce said supply voltage with an amplitude determined by the value of a first control signal and with a frequency determined by the value of a second control signal, the first control signal being supplied to a first input of said electric supply means by first means for regulating the amplitude of the supply voltage, and the second control signal being supplied to a second input of said electric supply means by second means for regulating the frequency of the supply voltage, said first and second means being arranged so that, for each value of said stator frequency, said amplitude of the supply voltage is able to vary as a function of a first regulation signal between a minimum value and a maximum value defined for each value of said stator frequency, the set of said maximum values defining a limiting voltage curve, said supply voltage frequency being regulated such that for each value of said stator frequency, the difference of frequency of rotation between said stator frequency and said rotor frequency is maintained substantially constant as long as said supply voltage amplitude has a value situated below said limiting voltage curve.

These characteristics result in practically optimal working conditions for the motor over a broad operating range. It is observed that optimum efficiency is obtained for a substantially constant frequency differential between the stator frequency and the rotor frequency, whatever may be the stator frequency and the supply voltage amplitude as long as the latter generates a magnetic flux through the rotor winding that is sufficiently below the saturation flux. The value of said frequency differential providing optimum efficiency is determined in dependence upon the characteristics of the asynchronous motor.

According to another characteristic of the control device according to the invention, the first and second means for regulating the supply voltage are arranged in a manner such that said frequency differential can be increased as a function of a second regulation signal when, for a given value of the stator frequency, the supply voltage amplitude has a value equal to said maximum value defined for said value of the stator frequency.

This characteristic leads to the possibility of increasing the value of the power supplied by the motor up to a threshold value at which the motor operates at its maximum capacity, because the limiting voltage curve may be situated relatively close to magnetic saturation of the motor and, by increasing the slip, the torque is increased as long as the value of the slip is situated in the working range.

The above-described electronic control thus permits great flexibility in exploiting the motor's possibilities. Moreover, it enables losses to be limited because it enables operation below the nominal supply voltage amplitude when the required torque can be supplied with a fixed optimum frequency difference for a supply voltage amplitude less than said nominal amplitude.

BRIEF DESCRIPTION OF THE DRAWINGS

The present invention will be better understood with the help of the following description, made with reference to the accompanying drawings which are given solely by way of example and in which.

DESCRIPTION OF PREFERRED EMBODIMENTS

Figure 1:
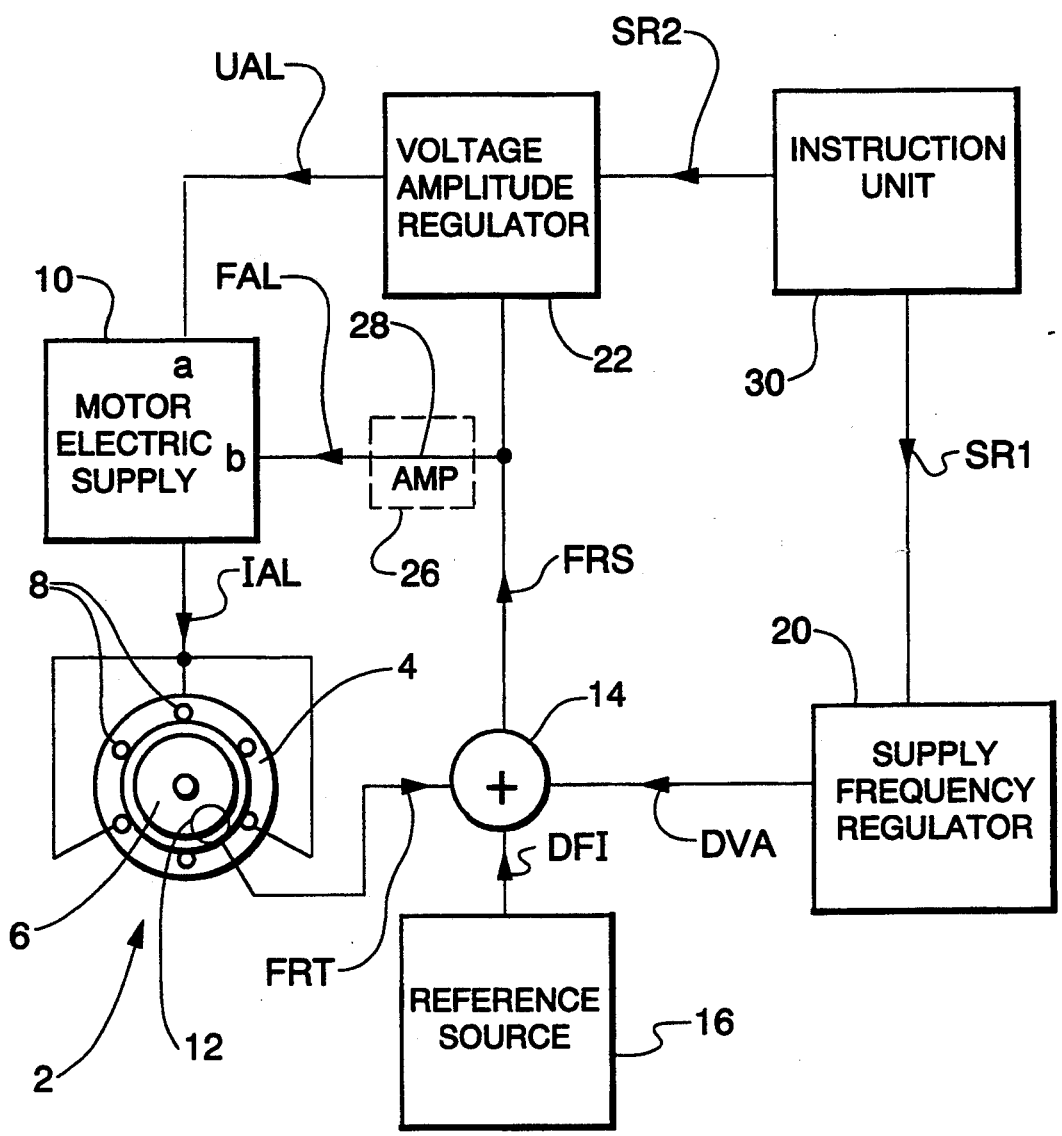
FIG. 1 shows a block diagram used to explain the principles of an asynchronous motor control device according to the invention.
Figure 2:
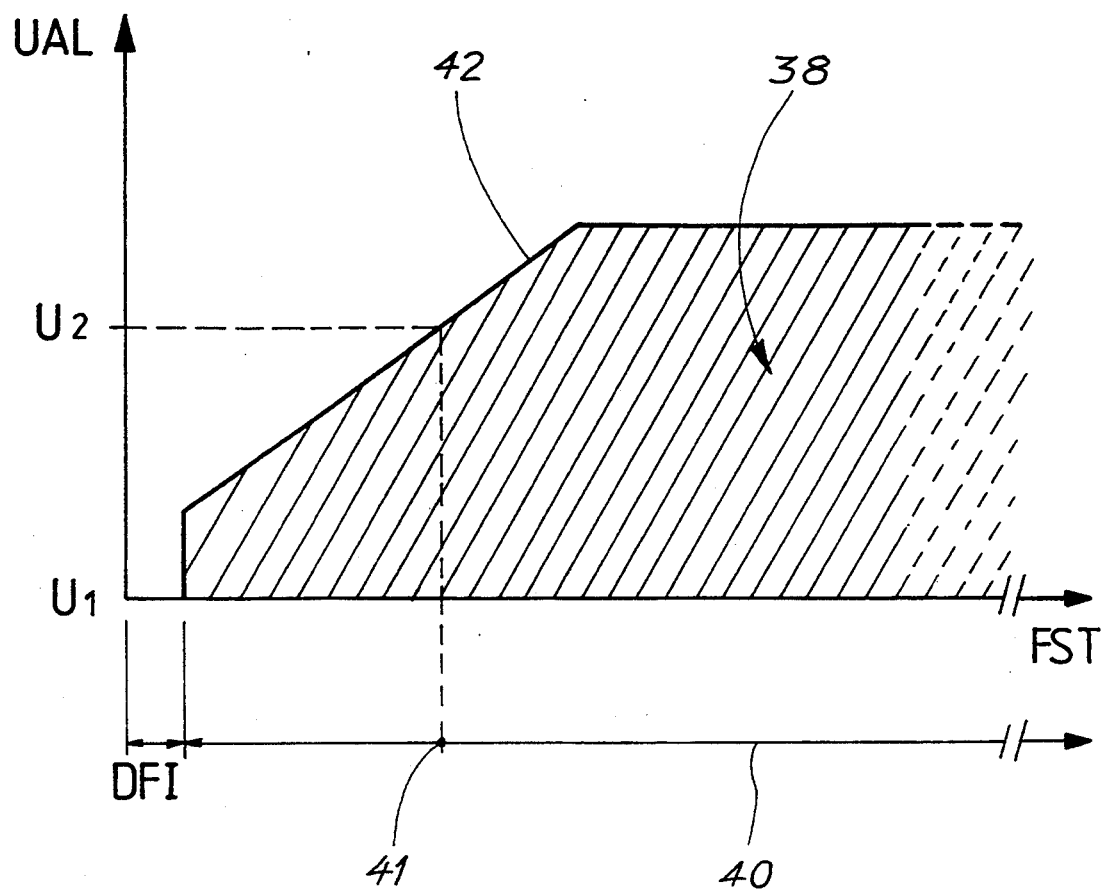
FIG. 2 schematically shows a supply domain of an asynchronous motor controlled by a control device according to the invention.

Referring to FIGS. 1 and 2, the asynchronous motor control device according to the invention and operation thereof will hereinafter be described in general.

In FIG. 1, asynchronous motor 2 comprises a stator 4 and a rotor 6, the stator 4 comprising a winding 8 connected to electrical supply means 10.

The electrical supply means 10, hereinafter referred to as the electric supply, are arranged to supply an AC supply voltage which is variable independently in amplitude and frequency and able to generate a supply current IAL in winding 8 of stator 4. The supply current IAL applied by electric supply 10 is also AC, for example three-phase.

Electric supplies which enable production of an AC voltage whose frequency and amplitude may be varied independently of one another at the terminals of a winding are known to the person skilled in the art. For example, such electric supplies include a Pulse-Width-Modulator (PWM) actuating a power switch, the latter being connected to a source of electric energy supplying a voltage of substantially constant value. Such a source of electric energy is for example a battery that can be installed in an electric vehicle.

The stator winding 8 is arranged in such a manner that said AC supply current flowing therein generates a turning magnetic field at a stator frequency FST in the region of the rotor 6, the latter rotating at a rotor frequency FRT in response to the turning magnetic flux. The frequency of rotation FRT of the rotor is measured by means of a detector 12 which produces a signal representative of the rotor frequency FRT and transmits it to an adder 14 to which detector 12 is connected.

The adder 14 is also connected to a unit 16 arranged to supply a signal representing a fixed frequency difference DFI, as well as to a unit 20 for regulating the difference of frequency of rotation between said stator frequency FST and said rotor frequency FRT. This unit 20 is arranged to produce a signal representative of a variable frequency difference DVA as a function of a regulation signal SR1 from an instruction unit 30, this signal being supplied to said adder 14.

The adder 14 is finally connected to electric supply 10 and to a unit 22 for regulating the amplitude UAL of the supply voltage, and supplies to them a signal representative of a resulting frequency FRS. The latter signal applied to an input 10b of electric supply 10 defines for said electric supply a control signal of the frequency FAL of the supply voltage with which it must supply the AC supply current IAL to motor 2.

It will be noted that if the number of pairs of poles of the stator winding 8 is other than 1, an amplifier 26 is provided in the electrical path 28 connecting the adder 14 and the electric supply 10. Said amplifier 26 generates a signal which defines in this case the control signal of frequency FAL of the supply voltage with which the electric supply must supply the AC supply current IAL to motor 2.

If the number of pairs of poles of stator winding 8 is P, the stator frequency FST of the turning magnetic field in the region of rotor 6 is given by the following mathematical relationship: FST=FAL/P. It is thus arranged that amplifier 26 multiplies the signal representative of the resulting frequency FRS by said factor P. Hence, neglecting the delay times due to inertia of the control device according to the invention, the resulting frequency FRS is equal to stator frequency FST.

Based on the resulting frequency FRS and on a regulation signal SR2 supplied by instruction unit 30, unit 22 determines a value for the amplitude UAL of the supply voltage and transmits a signal representing this value to an input 10a of electric supply 10, this signal defining a control signal for the supply voltage amplitude UAL.

The overall operation of the control of FIG. 1 is hereinafter described with reference to FIG. 2.

FIG. 2 defines a supply domain 38 on a graph showing the amplitude UAL of the supply voltage as a function of the stator frequency FST, the value of the latter being a whole number multiple of the value of the supply voltage frequency FAL. The set of values that can be taken by the stator frequency FST defines a range 40 of frequency values that the stator frequency FST can have.

For each frequency value 41 comprised in the range 40 of frequency values, the supply voltage amplitude UAL is able to vary between a minimum value U1 and a maximum value U2, these values being defined in a specific manner for each frequency value 41 in said range 40. The set of maximum values U2 defines a limiting voltage curve 42.

The control device according to the invention is so arranged that, firstly, the stator frequency FST, whose value is defined by the resulting frequency FRS, is equal to the sum of the rotor frequency FRT and of the fixed frequency difference DFI as long as the amplitude UAL of the supply voltage, defined by unit 22, has a value less than the maximum value U2 for this stator frequency FST, which corresponds to a value zero for the variable frequency difference DVA and, secondly, the difference of the variable frequency DVA is able to have a non-zero value when the supply voltage amplitude UAL is equal to a maximum value U2 along the limiting voltage curve 42.

To do this, unit 22 is firstly arranged in such a manner that, for any given value of the resulting frequency FRS, the signal of the supply voltage amplitude UAL it supplies to electric supply 10, in response to the regulation signal SR2, takes a value less than the maximum value U2 corresponding to this value of the resulting frequency FRS for a non-empty set E1 of values available to regulation signal SR2. Conjointly, units 20 and 30 are arranged so that the regulation signal SR1 takes a value in a non-empty set E2 of values available to this regulation signal SR1 when the value of the regulation signal SR2 belongs to set E1, and in this particular case, unit 20 produces at its output a signal representing a variable frequency difference DVA whose value is zero.

Secondly, unit 22 is arranged so that, for any given value of the resulting frequency FRS, said signal of amplitude UAL has a value equal to the maximum value U2 corresponding to this value of the resulting frequency FRS for a non-empty set E3 of values available to regulation signal SR2. Conjointly, units 20 and 30 are arranged in such a manner that regulation signal SR1 takes a value in a non-empty set E4 of values available to this regulation signal SR1 when the value of regulation signal SR2 belongs to set E3, and such that in this particular case, unit 20 produces at its output, for at least one regulation value SR1 belonging to set E4, a signal representing a variable frequency difference DVA whose value is non zero.

The asynchronous motor control device according to the invention thus enables the motor to be operated at optimum working conditions over substantially the entire supply domain 38 and hence to make the maximum use of the capabilities of the asynchronous motor whenever needed.

With the help of FIGS. 3 to 7, a first embodiment of an asynchronous motor control device according to the invention will be hereinafter described.

Figure 3:
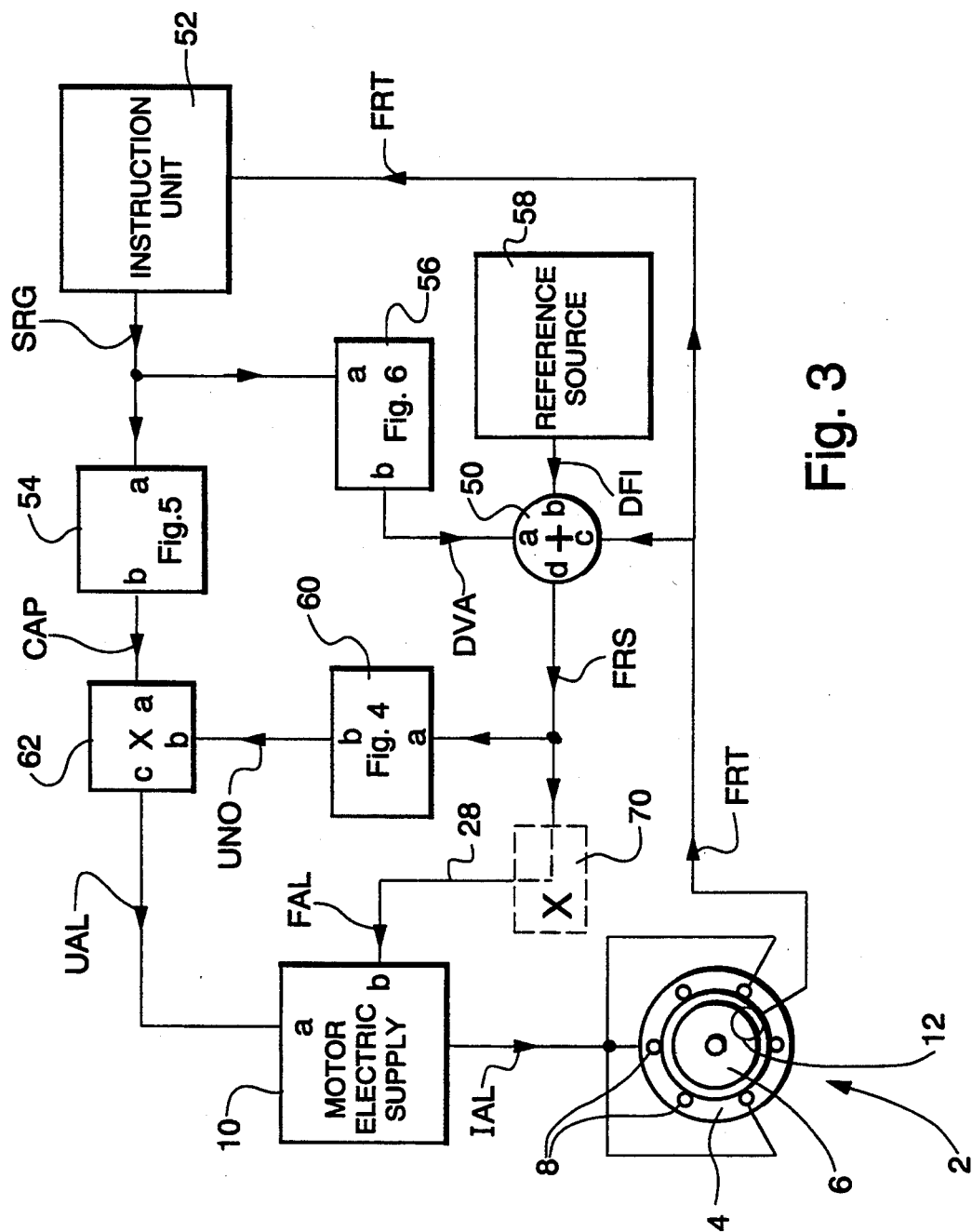
FIG. 3 represents a first embodiment of an asynchronous motor control device according to the invention.
Figure 4:
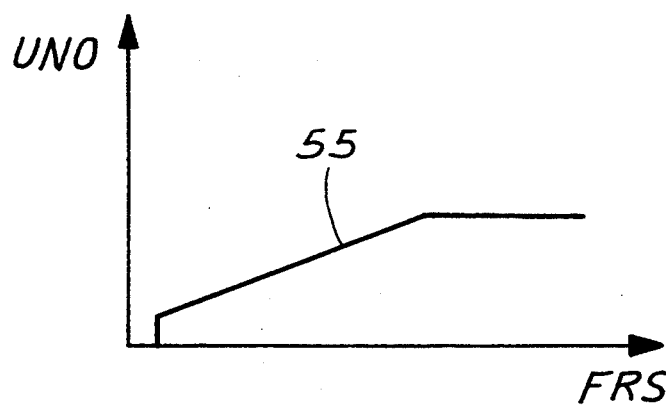
FIG. 4 schematically shows a characteristic defining a normalized amplitude of the voltage as a function of the stator frequency.

In FIG. 3, the asynchronous motor 2 comprises a stator 4 and a rotor 6, stator 4 having a winding 8 connected to an electric supply 10.

A detector 12 of the rotor's frequency of rotation FRT is connected to input 50c of an adder 50 and to an instruction unit 52. Instruction unit 52 is also connected to input 54a of a unit 54 for determining a coefficient of amplification and to input 56a of a unit 56 for regulating the difference of the frequency of rotation between the stator frequency and the rotor frequency. The output 56b of unit 56 is connected to input 50a of adder 50. A unit 58 producing a signal representative of a fixed and predetermined frequency difference DFI is also connected to an input 50b of adder 50. Output 50d of the latter is connected to input 10b of electric supply 10 and to input 60a of a unit 60 in which a normalized voltage-frequency curve 55 is memorized, such curve being schematically shown in FIG. 4.

The output 60b of unit 60 is connected to input 62b of a multiplier 62 which also has an input 62a connected to an output 54b of unit 54 for determining the amplification coefficient CAP. Lastly, output 62c of multiplier 62 is connected to input 10a of electric supply 10.

Figure 7:
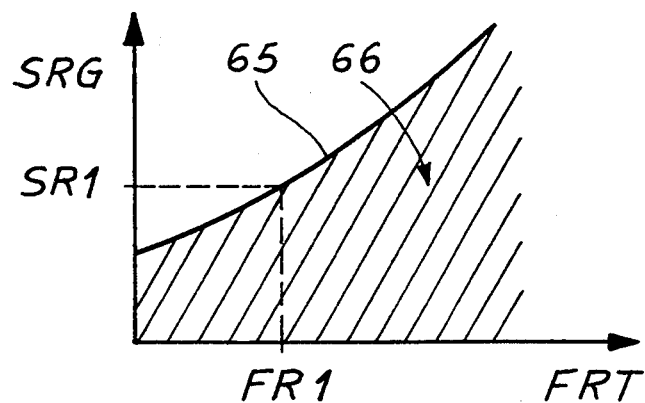
FIG. 7 schematically shows a characteristic defining a domain of predetermined values for the regulation signal as a function of the rotor's rotation frequency for a first embodiment.

Operation of this control device according to the invention is described hereinafter. The instruction unit 52 is arranged to produce a regulation signal SRG, the values which can be taken by this regulation signal depending on the rotor's frequency of rotation FRT whose value is communicated to instruction unit 52 by detector 12. FIG. 7 schematically shows the domain 66 of values that the regulation signal is able to take in dependence upon the rotor's frequency of rotation FRT and in particular the maximum regulation value SR1 for each value FR1 of said rotor's frequency of rotation, the limiting curve 65 of domain 66 being defined by the characteristics of the motor 2.

The regulation signal SRG produced by instruction unit 52 is applied to unit 54 and to unit 56. Unit 54, in response to the regulation signal SRG, produces a signal representative of an amplification coefficient CAP. Unit 56 produces, in response to regulation signal SRG, a signal representing a variable, frequency difference DVA transmitted to adder 50.

The adder 50 adds signal DVA to signal DFI and to signal FRT. Adder 50 produces a signal resulting from this addition and which represents a resulting frequency FRS. This resulting signal is applied to electric supply 10 via an amplifier 70, this latter component being necessary only if the stator winding 8 has a number of pairs of poles other than 1. Should this be the case, amplifier 70 multiplies the signal by a whole number P corresponding to the number of pairs of poles of stator winding 8. Said resulting signal defines a frequency control signal FAL for the supply voltage of electric supply 10.

The signal representing the resulting frequency FRS is also applied to unit 60 which supplies in response to this signal a signal representing a normalized voltage amplitude UNO. It is noted that curve 55, which determines the normalized voltage amplitude UNO in dependence upon the resulting frequency FRS, is proportional to the limiting voltage curve 42 schematically shown in FIG. 2.

The normalized voltage UNO is multiplied in multiplier 62 by the amplification coefficient CAP supplied by unit 54. Multiplier 62 then supplies to electric supply 10 a signal that controls the supply voltage's amplitude UAL, this electric supply 10 supplying, in response to said supplied signal, a voltage to the stator winding 8 of motor 2 having said amplitude UAL.

Operation of the control device according to the invention described with reference to FIGS. 1 and 2 is achieved in particular by means of the characteristic of unit 54 shown in FIG. 5, the latter unit serving to determine the coefficient of amplification CAP, and the characteristic of unit 56 shown in FIG. 6, the latter unit serving to regulate the difference between stator frequency FST and rotor frequency FRT.

Figure 5:
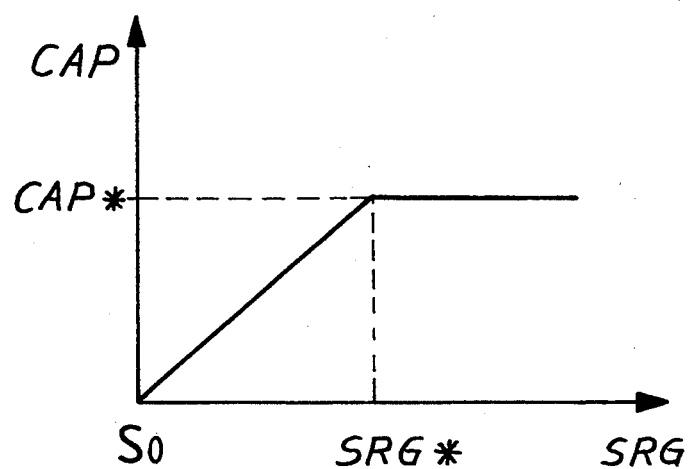
FIG. 5 schematically shows a characteristic defining a coefficient of amplification of a normalized voltage amplitude as a function of a regulation signal.
Figure 6:
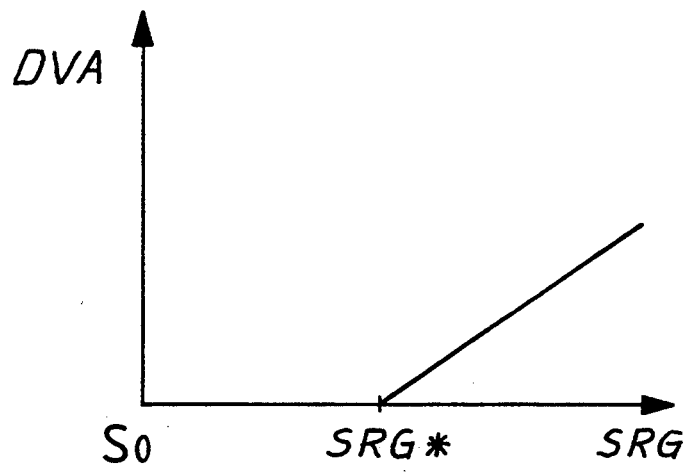
FIG. 6 schematically shows a characteristic defining a difference in the variable frequency of rotation between the turning stator magnetic field and the rotor, as a function of a regulation signal.

In FIGS. 5 and 6, it can be observed that the value of the variable, frequency difference DVA is fixed at zero as long as regulation signal SRG is below a given value SRG*. Moreover, the amplification coefficient CAP increases in a substantially linear manner as a function of the regulation signal SRG between the initial value S0 and value SRG*. It will however be noted that it is possible to arrange that the variable, frequency difference DVA increases slightly and progressively between the value S0 and value SRG* of regulation signal SRG to provide optimum efficiency of the asynchronous motor.

For value SRG*, the amplification coefficient CAP reaches its maximum value CAP*. When regulation signal SRG is greater than SRG*, the amplification coefficient is maintained at the maximum value CAP*. This coefficient CAP* is determined such that the normalized voltage-frequency curve 55 of FIG. 4 multiplied by said coefficient CAP* gives the limiting voltage curve 42 schematically shown in FIG. 2, this limiting voltage curve 42 being predetermined depending on the motor's characteristics and dimensions.

Thus, as long as regulation signal SRG is below value SRG*, the resulting frequency FRS, equivalent to stator frequency FST, corresponds to the rotor frequency to which has been added an optimum fixed frequency difference DFI. Furthermore, according to the value of regulation signal SRG between the initial value S0 and value SRG*, the signal representing the supply voltage amplitude UAL and that is applied by multiplier 62 to electric supply 10 is able to vary, for each value of the resulting frequency FRS equivalent to stator frequency FST represented in FIG. 2, between the minimum value U1 and the maximum value U2 belonging to the limiting voltage curve 42, as schematically shown in FIG. 2.

The regulation signal SRG* corresponds therefore to a transitory regulation between two supply modes. When the value of regulation signal SRG is greater than value SRG*, the amplification coefficient CAP retains a constant value CAP*, so that the control signal of supply voltage amplitude UAL is representative of a value of the limiting voltage curve 42, whatever may be the value of the resulting frequency FRS. For a given rotor frequency FRT, the maximum torque supplied by motor 2 for a fixed frequency difference DFI between the stator frequency and the rotor frequency is reached when regulation signal SRG is equal to SRG*.

Above value SRG*, the torque supplied by the motor is increased, for a given rotor frequency FRT, by increasing the difference in the frequency of rotation between the stator frequency FST and rotor frequency FRT, as is shown in FIG. 6. Hence, the signal representative of the variable, frequency difference DVA, produced by unit 56 and applied to adder 50, is greater than zero when regulation signal SRG has a value greater than SRG*. This increase in the difference of the frequency of rotation between the stator frequency and rotor frequency is increased in dependence upon the frequency of rotation FRT of the rotor by the limiting curve 65 represented in FIG. 7. It will be noted that, advantageously, the variable, frequency difference DVA is maintained constant when it has reached a maximum pre-determined value; that is, from a given value of the regulation signal, an increase of this regulation signal no longer generates an increase of the variable, frequency difference DVA.

In summary, amplitude UAL of the supply voltage increases, for a given rotor frequency of rotation FRT, between the predetermined minimum value U1 and the predetermined maximum value U2 for a stator frequency FST equal to said rotor frequency FRT to which has been added an optimal fixed frequency difference DFI, when the regulation signal increases between the initial value S0 and value SRG*. Then, assuming that the rotor frequency remains constant and that the value of the regulation signal continue to increase above value SRG*, the difference in frequency between stator frequency FST and rotor frequency FRT increases, which corresponds to an increase of the slip, and the amplitude of the supply voltage with which the electrical energy source supplies motor 2 takes the maximum possible value for the resulting frequency value FRS, or respectively for the stator frequency FST resulting from the increase of the frequency difference.

Figure 8:
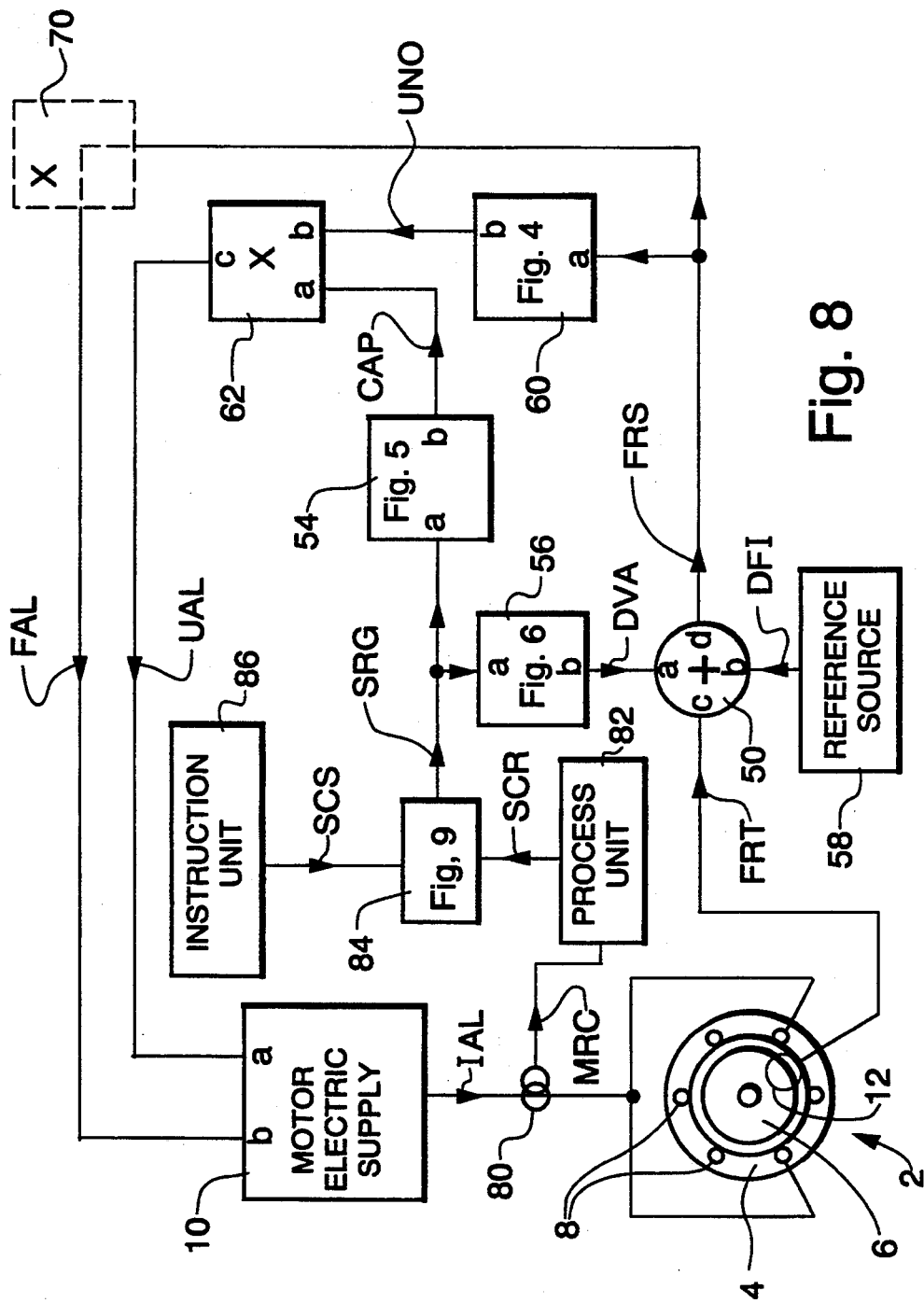
FIG. 8 represents a second embodiment of an asynchronous motor control device according to the invention.

FIG. 8 shows a second form of control device according to the invention, this control device serving to regulate the supply current IAL.

To do this, an instrument 80, which may, for example, comprise two model LT 300-S current sensors sold commerically by LEM, S.A., Switzerland, is provided for measuring the supply current IAL flowing between the electric supply 10 and stator winding 8. In the case of a three-phase supply current IAL, it is only necessary to measure the current on two phases, as has been schematically indicated in FIG. 8.

The supply-current measuring device 80 produces a signal MRC, representing the measurement of the current, which is applied to a unit 82 for processing this signal. This unit 82 produces, in response to signal MRC, a processed signal SCR which is transmitted to a unit 84 for producing the regulation signal SRG. Unit 84 is also connected to a unit 86 serving as instruction member, for example the accelerator pedal of an electric vehicle. This unit 86 produces an instruction signal SCS that is applied to unit 84. Hence, unit 84 produces a regulation signal SRG in response to the two signals SCR and SCS.

Figure 9:
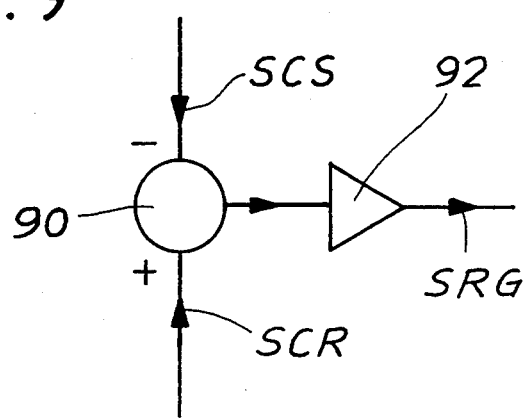
FIG. 9 represents an embodiment of an electronic device producing the regulation signal for the second embodiment.

An embodiment of the electronic circuitry of unit 84 producing regulation signal SRG is shown in FIG. 9. From this Figure, it is noted that the instruction signal SCS and the processed signal SCR of the measurement of supply current IAL are subtracted from one another by means of a differentiator 90. The result of this subtraction is then applied to an integral-proportional regulator 92. In this case, the signal leaving regulator 92 (notably a voltage signal) constitutes the regulation signal SRG.

The remainder of the second form of the control device shown in FIG. 8 is similar to the first form shown in FIG. 3, apart from the limitation of the value of regulation signal SRG in terms of the value of the rotor frequency as shown in FIG. 7. A maximum value of the instruction signal is provided, which sets a maximum value of the supply current IAL and ensures operation below the saturation point of the motor, for all rotor frequencies.

By means of the regulation electronics shown in FIG. 9, the value of regulation signal SRG varies as long as the value SCR of the processed current-measurement signal MCR is different from the instruction value SCS. However, when SCR and SCS are equal, the value of regulation signal SRG remains constant. The maximum value of instruction signal SCS that unit 86 is able to transmit to unit 84 for producing the regulation signal SRG hence determines the maximum value for the supply current IAL of asynchronous motor 2, this maximum value being predetermined in dependence upon the asynchronous motor 2's characteristics.

I claim:

1. A control device for controlling an asynchronous motor having:
   a stator winding for producing a turning magnetic field at a stator frequency (FST) in response to an AC supply voltage applied to said stator winding and producing a supply current (IAL); and
   a rotor comprising a rotor winding magnetically coupled to said stator winding, said rotor rotating at a rotor frequency (FRT) in response to said turning magnetic field;
   said control device comprising electric supply means for producing said supply voltage and being characterized in that said electric supply means produce said supply voltage with an amplitude (UAL) determined by the value of a first control signal and with a frequency (FAL) determined by the value of a second control signal, the first control signal being supplied to a first input of said electric supply means by first means for regulating the amplitude (UAL) of the supply voltage, and the second control signal being supplied to a second input (10b) of said electric supply means by second means for regulating the frequency (FAL) of the supply voltage, said first and second means being arranged so that, for each value of said stator frequency (FST), said amplitude (UAL) of the supply voltage varies as a function of a first regulation signal (SR2;SRG) between a minimum value (U1) and a maximum value (U2) defined for each value (41) of said stator frequency, said maximum values (U2) together defining a limiting voltage curve, said supply voltage frequency (FAL) being regulated so that for each value of said stator frequency (FST), the difference in rotation frequency between said stator frequency (FST) and said rotor frequency (FRT) is maintained substantially constant as long as said supply voltage amplitude (UAL) has a value less than said maximum value (U2) defined for the given value of the stator frequency.

2. A control device according to claim 1, characterized in that said first and second regulation means for the supply voltage are arranged so that said difference in rotation frequency can be increased as a function of a second regulation signal (SR1,SRG) when, for a value of the stator frequency (FST), said supply voltage amplitude (UAL) has a value equal to said maximum value (U2) defined for said value of the stator frequency.

3. A control device according to claim 1 or 2, characterized in that said second means for regulating the stator frequency comprise:
   first means for measuring said frequency of rotation (FRT) of said rotor;
   a first unit for producing a signal representing a fixed frequency difference (DFI);
   a second unit for regulating said difference in rotation frequency between said stator frequency (FST) and said rotor frequency (FRT), said second unit supplying at an output of said second unit a signal representing a variable frequency difference (DVA) in response to said second regulation signal (SR1;SRG) applied to an input of said second unit by a third instruction unit;
   an adder having inputs connected to said first measuring means and to said first an second units and an output connected to said second input of said electric supply means and to said means for regulating the supply voltage amplitude (UAL), said adder adding said rotor frequency (FRT) to said fixed frequency different (DFI) and to said variable frequency difference (DVA) to supply at its output a signal representing a resulting frequency (FRS) defining said second control signal.

4. A control device according to claim 3, characterized in that said first means for regulating the amplitude (UAL) of the supply voltage comprise:
   a fourth unit having an input connected to the output of said adder and in which is memorized a normalized voltage-frequency curve whereby a signal representing a normalized voltage amplitude (UNO) is produced at an output of said fourth unit in dependence upon said signal representing said resulting frequency (FRS) from said adder;
   a fifth unit, having an input connected to said third instruction unit, for producing an amplification coefficient (CAP) at an output of said fifth unit in response to said first regulation signal (SR2,SRG) supplied by said third instruction unit;
   a multiplier having inputs connected to said fourth and fifth units and an output connected to said first input of said electric supply means, for multiplying said normalized voltage amplitude (UNO) from the fourth unit and said amplification coefficient (CAP) from the fifth unit, the result of said multiplication defining said first control signal being transmitted to said first input of said electric supply means.

5. A control device according to claim 4, characterized in that an amplifier is provided in the electric path connecting said adder to said electric supply means (10), said amplifier multiplying said signal representing said resulting frequency (FRS) by a factor (P) corresponding to an even number of poles of said stator winding of said motor.

6. A control device according to claim 4 characterized in that said first regulation signal (SR2;SRG) and said second regulation signal (SR1;SRG) define a common regulating signal (SRG).

7. A control device according to claim 6, characterized in that said first measuring means are connected to said third instruction unit said third instruction unit determining, for each value (FR1) of said rotor frequency (FRT), a maximum value (SR1) for said common regulation signal (SRG).

8. A control device according to claim 6, characterized in that said third instruction unit comprises second measuring means for measuring said supply current (IAL), a regulation device and an instruction member, said second measuring means being connected to said regulation device to apply to said regulation device a measuring signal (SCR), said regulation device being also connected to said instruction member which supplies to said regulation device an instruction signal (SCS), said regulation device producing said common regulation signal (SRG) in response to said instruction signal (SCS) and said measuring signal (SCR).

9. A control device according to claim 8, characterized in that said regulating device comprises a differentiator which carries out a subtraction between said instruction signal (SCS) and said processed signal (SCR), the result of said subtraction being transmitted to a proportional-integral regulator that produces said common regulating signal (SRG).

10. A control device according to claim 3, characterized in that said third instruction unit (52) comprises means for accelerating an electric vehicle, said motor with which the said control device is associated serving as means for driving said electric vehicle.

* * * * *